Dec. 10, 1963 R. A. RUEHRWEIN 3,113,914
PROCESS FOR MAKING OZONE
Filed March 4, 1960
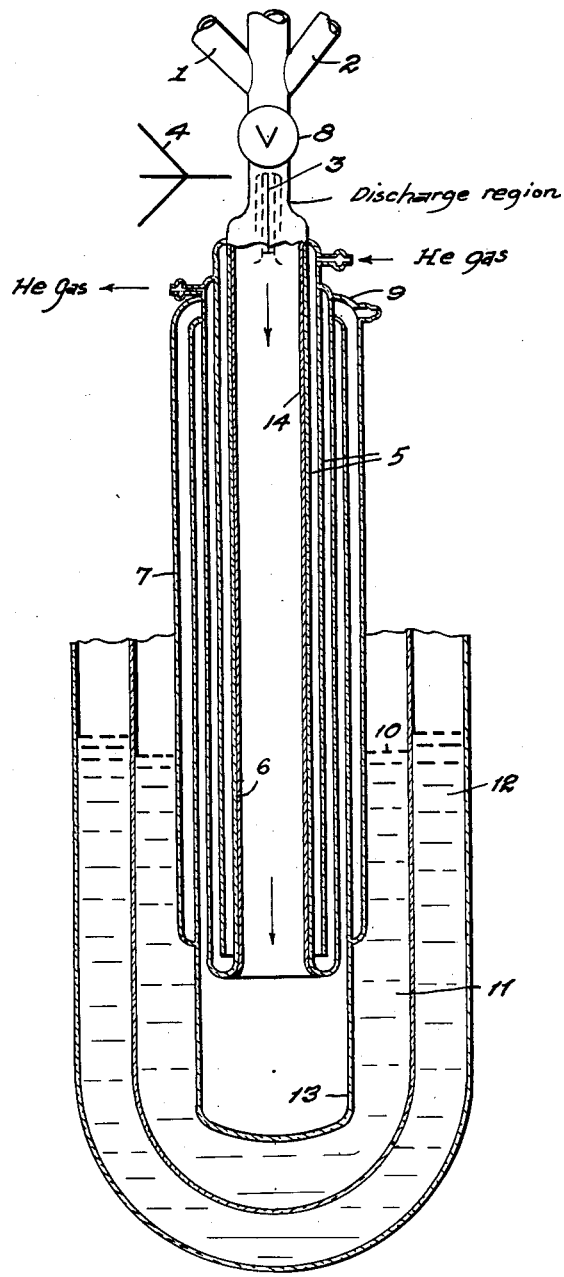
INVENTOR.
Robert A. Ruehrwein

United States Patent Office

3,113,914
Patented Dec. 10, 1963

3,113,914
PROCESS FOR MAKING OZONE
Robert A. Ruehrwein, Dayton, Ohio, assignor to the United States of America as represented by the Secretary of the Army
Filed Mar. 4, 1960, Ser. No. 12,885
2 Claims. (Cl. 204—176)

This invention relates to a process for the increase production of ozone. It is more particularly concerned with the increased production of ozone by premixing oxygen and nitrogen gases before subjecting them to an electrical discharge and collecting the products in a cold trap. Ozone is a very effective oxidizing agent and may be used, as such, in fuels in missiles, aircraft and the like.

Numerous methods have been described for the production of ozone. The condensation at 4.2° K. of the gaseous products of a high-frequency electrodeless discharge through oxygen followed by the warming of the condensed solid has been shown by Broida and co-workers to lead to the formation of ozone. The Broida et al. U.S. Patent No. 2,892,766 relates to this subject matter. The conversion of oxygen to ozone by this method is about 18 percent effective, which is substantially more than the few percent of ozone obtained with the usual ozonizer.

This invention is an improvement over the Broida et al. patent, supra, and other methods of producing ozone.

Accordingly, the primary object of this invention is to provide a method that substantially increases the amount of ozone formation.

The single FIGURE in the drawing illustrates the apparatus utilized in carrying out the process of the present invention.

Referring to the drawing:

The oxygen gas is introduced through inlet 1 and the nitrogen gas is introduced through inlet 2. The oxygen and nitrogen gases are mixed and metered through control stopcock 8. The mixed gases traverse a discharge region 3 at a low pressure of the order of 0.1 to 10 mm. Hg. The discharge in discharge region 3 is excited by means of a microwave (2450 mc./sec.) voltage induced by antenna 4 which in turn is supplied from any suitable high frequency source (not shown). The single walled lower extremity collecting vessel 13 immersed in liquid helium 11 acts as a trap by freezing out the ozone and thus acts as a high speed vacuum pump for maintaining the gas flow. In order to prevent solidification of discharge products at temperatures above about 4° K. (the liquefaction temperature of helium) the flow is carried to the lower portions of the apparatus within a passageway kept nearly at room temperature. This relatively high temperature is maintained by forcing helium gas at room temperature between compound walls 5 surrounding the channel 6 through which the discharge products pass. Since these walls make solid contact with the remainder of the system only at the upper (room temperature) extremity, as shown at 9, the introduction of such a sheath of warm gas extending considerably below the liquid helium level 10 causes but a slight heat input. By this means, however, the products of the discharge pass abruptly from room temperature to the collecting vessel 13 at low temperature and accumulate in solid form upon contact with the walls of vessel 13. A vacuum region 7 surrounds the entire assembly above chamber 13.

The liquid helium bath may be insulated from the outside temperature by an additional bath of liquid nitrogen 12 to reduce the amount of liquid helium required to maintain vessel 13 at a very low temperature.

Channel 6 may be coated with a film of phosphoric acid, indicated at 14 in the drawing, from the discharge region to the cold trap. By the inclusion of a film of phosphoric acid on channel 6 greater yields of ozone are obtained in the collecting vessel.

To establish a basis for comparison equimolal portions of oxygen gas and nitrogen gas are introduced through channels 1 and 2 respectively. 2.13 moles of nitrogen gas per mole of oxygen gas are used in the experiment. The mixed gases are then passed through a flow meter and a control stopcock into a Pyrex tube and through an electrodeless electric discharge at a pressure of approximately 1 mm. Hg. The discharge is maintained in a waveguide resonator by a 2450 mc./sec. power supply (125 watts). The discharge products are then led into a Pyrex tube the bottom of which is immersed in liquid helium and maintained at a temperature range between 4–77° K. This acts as a trap or condenser by freezing out all gases and thus an effective high speed pump for maintaining the flow of gas.

On warming the condensate it was found that about 40% of the oxygen had been converted to ozone.

For comparison, in a separate experiment using the same amount of gas, apparatus and method as above, oxygen alone was subjected to an electrodeless discharge and the products condensed. On warming the condensate it was found that about 18 percent of oxygen had been converted to ozone.

Another experiment was carried out as above, except nitrogen gas was blended with oxygen downstream, after the oxygen had been subjected to the electrical discharge. The results were substantially the same as using no nitrogen at all in the experiment. About an 18 percent conversion of oxygen to ozone had taken place.

In the above example, wherein equimolal portions of oxygen gas and nitrogen gas are premixed before being subjected to an electric discharge, a solution of phosphoric acid was applied to channel 6 forming a thin film of phosphoric acid between the discharge region and the collecting vessel. It was found that yields in excess of 40% oxygen to ozone were obtained from the process when the phosphoric acid coating was used.

Increased yields of the valuable product ozone can be obtained by premixing nitrogen gas with oxygen gas before the gaseous mixture is subjected to an electrical discharge and condensed at temperatures below about 77° K. It has been shown that over 40 percent of the oxygen is converted to ozone.

I claim:

1. A process for producing ozone which comprises mixing in an ozonator about equimolal amounts oxygen and nitrogen gas, subjecting the gaseous mixture to an electric discharge capable of disassociating the mixture at ambient temperature and at a pressure of from 0.1 to 10 mm. Hg and rapidly pumping the products of said discharge into a low temperature trap maintained between 4° and 77° K., and recovering ozone formed thereby.

2. A process for producing ozone which comprises mixing in an ozonator about equimolal amounts oxygen and nitrogen gas, subjecting the gaseous mixture to an electric discharge capable of disassociating the gases of the mixture at ambient temperature, passing the disassociated gases through a channel coated with phosphoric acid and rapidly pumping the products of said discharge into a low temperature trap maintained between 4° and 77° K., and recovering ozone formed thereby.

References Cited in the file of this patent
UNITED STATES PATENTS

| | | |
|---|---|---|
| 2,850,446 | Cromwell | Sept. 2, 1958 |
| 2,892,766 | Broida et al. | June 30, 1959 |
| 2,924,562 | Golden | Feb. 9, 1960 |
| 3,005,762 | Fenn | Oct. 24, 1961 |

OTHER REFERENCES

Steacie: American Chemical Soc. Monograph, No. 102 (1946), pages 32, 33 and 36.